Fig. 1
Fig. 2
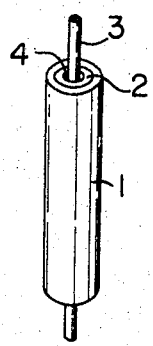
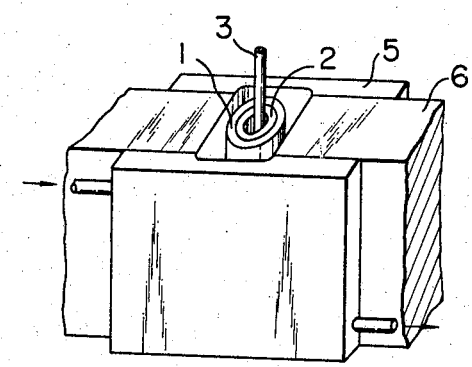
Fig. 3
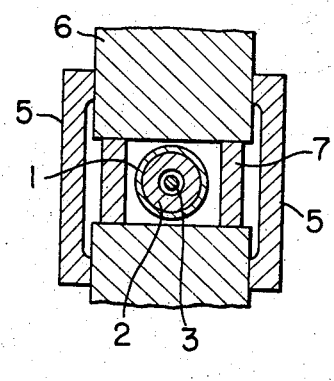

3,352,993
METHOD FOR ELECTROSLAG WELDING
Haruyoshi Suzuki, Nerima-ku, Tokyo, and Keizo Ishizaki, Suginami-ku, Tokyo, Japan, assignors to Yawata Welding Electrode Co., Ltd., Chuo-ku, Tokyo, Japan, a company of Japan
Filed Feb. 7, 1966, Ser. No. 525,465
Claims priority, application Japan, Feb. 6, 1965, 40/6,272
6 Claims. (Cl. 219—73)

This invention relates to an apparatus and method for electroslag welding and more particularly it relates to a coated consumable nozzle and method for using such a nozzle in an electroslag welding process.

Electroslag welding is a welding process whereby heat is generated by passing an electric current between an electrode and the base metals via a slag pool. The slag pool is heated to a temperature in excess of the melting point of the base and filler metals. The high temperature increases the electrical conductivity of the slag. It fuses to the face of the metals, and the electrode is immersed in it. The molten base metal and filler metal collect at the bottom of the slag pool and form the weld pool, which, when solidifying, forms a weld and joins the surfaces.

The main function of the slag in electroslag welding is to transform electrical energy into thermal energy, and therefore a very important property of slag is its electrical conductivity, and the variation thereof with temperature. The electrical conductivity of fused slags or flux increases abruptly with a rise in temperature, and below certain temperatures, and particularly when solid, slags or fluxes become practically nonconducting.

Electroslag welding normally is carried out along a vertical axis. Therefore, molding plates are normally disposed around the base metals to help shape the weld. These molding plates can also act as cooling plates and commonly are used in the form of slidable copper cooling plates. As electrode wire is melted into the slag pool, and as the slag pool cools the copper plates are slid vertically along the weld axis.

Normally, a nozzle is provided around the electrode to guide it. In ordinary electroslag welding, this nozzle must be moved upwardly as the weld progresses to avoid melting it. Often expensive and complicated apparatus are required to move the cooling plates and the nozzle.

One manner of overcoming the expense and difficulty of moving the nozzle and cooling plates is the provision of a consumable nozzle. By use of a consumable nozzle, since it is consumed in the welding process, there is no longer any need to move it, and the copper cooling plates for molding the weld also can be fixed in position. As the welding proceeds, the nozzle is gradually melted, and the electric source is switched off when the nozzle is entirely consumed.

The consumable nozzle is normally composed of welding metal and is similar to the material of the electrode wires. Nozzles have generally been made in the form of an assembly of stamped or welded plates, rods or tubes, in which a channel is provided for the passage of the electrode wire therethrough.

Since the nozzle is made of a material similar to that of the electrode, and is therefore electrically conducting, a substantial risk of short-circuiting the base metals exists. In the past, in order to prevent a short-circuit of the base metals, the gap between the metals has been enlarged. However, such a method has the disadvantage that a great deal of weld metal must be deposited in the gap. A second method of preventing the short-circuiting of the base metal has been to provide an insulating material between the nozzle and the base metal. Such insulating material must be heat resistant as well as electrically nonconducting. Since it will be melted during the welding process, and therefore can only be used once, it must also be inexpensive. The most suitable material used in the past has been glass. However, since glass is different in composition from the weld metal, the strength of the weld can be decreased by the presence of glass therein.

Another difficulty encountered in electroslag welding is that the cut ends of the base metal tend to deform or rotate before they weld. This often results in a 2-4 mm. difference between the maximum top dimension and the minimum bottom dimension. This deformation can be prevented by initially providing a slightly different dimension at the top and bottom and providing a reinforcing plate to secure the metals in position.

A good discussion of electroslag welding and electroslag welding using a consumable nozzle can be found in Paton, Electroslag Welding, American Welding Society, Inc., 1962.

In order to overcome the difficulties above discussed, the instant invention provides a consumable nozzle having a coated layer thereon. The coated layer comprises a coating of flux or slag material. The fused slag or flux below certain temperatures greatly decreases in electrical conductivity. In its solid state, slag or flux is actually a good insulator. Therefore, it can form an excellent coating for insulating the nozzle. As the nozzle is consumed in the slag, the flux, or slag material, due to the heat of the welding, becomes molten, and its electrical conductivity greatly increases. It becomes part of the slag pool, and contributes no impurities to the weld.

A description of the properties of slag or flux materials commonly used can be found on pages 99–103 of the above-mentioned text, and the description of the flux properties and compositions described in that text are incorporated herein by reference.

The instant invention also encompasses a method for carrying out electroslag welding incorporating a coated consumable nozzle, and the insulating coating composition therefor.

The consumable nozzle in the preferred embodiment of this invention is in the form of a hollow cylinder or tube, through which an electrode can pass. The outer surface of the nozzle is coated with the slag or flux material as an insulating layer. The size of this nozzle will naturally depend upon the gap between the base metals to be filled or welded. However, it has been found that in the preferred embodiment of this invention, the annular cross-sectional area of the nozzle should be within the range from about 35 to about 200 mm.$^2$. If the nozzle is of a smaller area than 35 mm.$^2$, for nozzle length of 500 mm. or more, it may be deformed, due to the heat caused by the passage through the nozzle of high welding currents of the order of 400 amps or more. Further, if the sectional area of the nozzle is greater than 200 mm.$^2$ it may often be necessary to enlarge the gap between the ends of the base metal and require an increased amount of weld metal to be deposited.

The composition of the nozzle in a preferred embodiment of this invention includes by weight up to about 0.12% carbon, up to about 0.6% manganese, up to about 0.35% silicon, up to about 0.03% phosphorus and up to about 0.3% sulfur. When the composition of the nozzle is varied above the above limits, and especially with regard to carbon, phosphorus and sulfur, the deposited metal of the weld is weakened and good notch-toughness is not attained.

The coating is generally held to the surface of the tubular nozzle with a suitable binder, and may be applied by any conventional means, such as by extruding the composition onto the nozzle or dipping the nozzle in a molten insulating composition. The coating is normally applied in a thickness within the range from about 0.5 to about 2.5 mm. When the thickness of the coating is below about 0.5 mm., the electrical insulation between the nozzle and the ends of the base metals may be insufficient to prevent arcing at high voltages. Further, if the coating should be thicker than about 2.5 mm. an excess of slag may be deposited into the pool and an overly deep slag pool will result; an overly deep slag pool is undesirable in such a welding process.

The coating generally comprises from about 20 to about 50% silicon dioxide, from about 5 to about 40% calcium oxide, up to about 25% magnesium oxide, up to about 25% manganous oxide, up to about 15% aluminum oxide and up to about 40% calcium fluoride, all by weight.

A suitable alloying agent for the weld, such as iron-molybdenum, can be incorporated into the coated layer composition in an amount up to about 30%.

Examples of typical and preferred insulating layer compositions are given in the table below. Other examples are given in the Electroslag Welding text, as indicated above, pages 99–103, and are incorporated herein by reference.

| Example No. | Percent by Weight | | | | | | |
|---|---|---|---|---|---|---|---|
| | SiO₂ | CaO | MgO | MnO | Al₂O₃ | CaF₂ | FeMo¹ |
| 1 | 38 | 24 | 9 | 7 | 14 | 8 | |
| 2 | 41 | 24 | 6 | 15 | 2 | 12 | |
| 4 | 29 | 31 | 21 | | 10 | 9 | |
| 6 | 27 | 5 | 6 | 24 | 13 | 16 | 9 |

¹ Alloying agent.

The process of the instant invention is an improvement in the process for electroslag welding using a consumable nozzle, including the steps of feeding an electrode via the nozzle into the slag pool, and passing an electric current therethrough to effect welding of the base metals. This improvement comprises employing a consumable nozzle with an insulating surface layer formed of an electroslag welding flux material.

It is also possible in the practice of this invention to use a spacer or spacers in the gap between the opposite ends of the base metals. This can help prevent the deformation of the weld and will also lessen unnecessary weld penetration of the metals and enhance the welding rate by melting of the spacers themselves.

The coating of the instant invention comprises a coating for a consumable nozzle, of a solid slag material having a composition by weight of from about 20 to about 50% silicon dioxide, from about 5 to about 40% calcium oxide, up to about 25% magnesium oxide, up to about 25% manganous oxide, up to about 15% aluminum oxide and up to about 40% calcium fluoride.

In the drawings:

FIGURE 1 is a view in perspective of one embodiment of the coated consumable nozzle of this invention.

FIGURE 2 is a view in perspective illustrating one embodiment of the method of welding in accordance with the instant invention, employing a consumable nozzle.

FIGURE 3 is a view in section of an embodiment of the invention, employing spacers.

In FIGURE 1, a substantially cylindrical and tubular consumable nozzle is shown. Disposed through the center bore 4 of this nozzle is a welding electrode or wire 3. The body 2 of this consumable nozzle has an annular sectional area within the range from about 35 to about 200 mm.², and has a composition by weight of up to about 0.12% carbon, up to about 0.60% manganese, up to about 0.35% silicon, up to about 0.03% phosphorus and up to about 0.03% sulfur. The surface of this body 2 is coated with a slag or flux material 1. This is in a fused or solid state, and has a composition by weight of from about 20 to about 50% silicon dioxide, from about 5 to about 40% calcium oxide, up to about 25% magnesium oxide, up to about 25% manganous oxide, up to about 15% aluminum oxide and up to about 40% calcium fluoride.

This embodiment of the invention contains no alloying agent. However, a suitable alloying agent, for example FeMo, can be added in an amount up to about 30% by weight.

In the fused or solid state this flux or slag material is electrically relatively nonconducting, and therefore forms a good insulating material for the consumable nozzle and thereby prevents electrical shorting between the nozzle and the base metals. However, when the nozzle and the coating melt and become part of the slag pool the coating composition becomes electrically conducting and becomes part of the slag pool, and contributes no impurities to the weld.

In FIGURE 2, a process of the instant invention is shown using the coated consumable nozzle described above. In this process, the base metal surfaces 6 to be welded are surrounded by copper cooling plates 5, through which a cooling agent, such as water, can be circulated. These cooling plates are fixed in place, and are not slidably mounted. The coated consumable nozzle, as described above, has a body 2 and a coated surface 1. It is inserted between the ends of the base metal, and the electrode is passed therethrough. Current is caused to flow through the electrode, and heat is generated by the passage of the current; and the nozzle, the coating and the electrode are gradually melted as the welding process is carried out.

In FIGURE 3 a variation of the above process is shown. In this process, spacers 7 are used. These spacers help prevent deformation of the joint during welding, and also reduce the amount of material that need be deposited in the weld.

Several particular examples of the process, the coated nozzle, and the coating layer are given below:

EXAMPLE 1.—ELECTROSLAG BUTT-WELDING WITH THE USE OF COATED, CONSUMABLE NOZZLE

| | Percent | | | | |
|---|---|---|---|---|---|
| | C | Si | Mn | P | S |
| Steel plate—thickness, 32 mm.; length, 1,000 mm. | 0.18 | 0.09 | 0.73 | 0.009 | 0.021 |
| Consumable nozzle—O.D., 12 mm.; I.D., 4 mm.; length 1,100 mm. | 0.09 | 0.31 | 0.46 | 0.016 | 0.017 |
| Welding wire—Dia., 2.4 mm. | 0.08 | 0.30 | 1.47 | 0.016 | 0.009 |

*Composition (percent) of coated layer of nozzle and flux used*

SiO₂ _____ 38
CaO _____ 24
MgO _____ 9
MnO _____ 7
Al₂O₃ _____ 14
CaF₂ _____ 8
Thickness of coated layer _____ mm__ 2
Length of gap between metal ends _____ mm__ 20
Welding conditions:
    Electric current _____ a__ 650
    Voltage _____ v__ 42
    Depth of slag pool _____ mm__ 50

*Mechanical properties of welded metal*

| | |
|---|---|
| Tensile strength _____ kg./mm.² | 58.4 |
| Elongation _____ percent | 28.5 |
| Impact valve (V-notch, 0° C.) ___ kg.-m./cm.² | 6 |

*Analysis (percent) of welded metal*

| | |
|---|---|
| C | 0.11 |
| Si | 0.19 |
| Mn | 1.09 |
| P | 0.012 |
| S | 0.015 |

EXAMPLE 2.—ELECTROSLAG T-WELDING WITH THE USE OF COATED, CONSUMABLE NOZZLE

| | Percent | | | | | |
|---|---|---|---|---|---|---|
| | C | Si | Mn | P | S | Mo |
| Steel plate—thickness, 25 mm.; length, 700 mm. | 0.16 | 0.32 | 1.22 | 0.023 | 0.018 | |
| Consumable nozzle—O.D., 10 mm.; I.D., 4 mm.; length, 800 mm. | 0.09 | 0.01 | 0.46 | 0.016 | 0.017 | |
| Welding wire—Dia., 3.2 mm. | 0.10 | 0.02 | 1.65 | 0.013 | 0.016 | 0.52 |

*Composition (percent) of coated layer of nozzle and flux used*

| | |
|---|---|
| $SiO_2$ | 41 |
| CaO | 24 |
| MgO | 6 |
| MnO | 15 |
| $Al_2O_3$ | 2 |
| $CaF_2$ | 12 |
| Thickness of coated layer _____ mm | 1 |
| Length of gap between metal ends _____ mm | 20 |
| Welding conditions: | |
| Electric current _____ a | 550 |
| Voltage _____ v | 35 |
| Depth of slag pool _____ mm | 50 |

*Welded metal*

Impact test (V-notch, ° C.):
| | |
|---|---|
| 22 _____ kg.-m./cm.² | 12 |
| 0 _____ kg.-m./cm.² | 9 |
| Appearance | Good |
| Mechanical properties | Good |

*Composition (percent)*

| | |
|---|---|
| C | 0.10 |
| Si | 0.24 |
| Mn | 1.25 |
| P | 0.016 |
| S | 0.17 |
| Mo | 0.24 |

EXAMPLE 3.—ELECTROSLAG BUTT-WELDING WITH THE USE OF COATED, CONSUMABLE NOZZLE AND SPACERS

| | Percent | | | | |
|---|---|---|---|---|---|
| | C | Si | Mn | P | S |
| Steel plate—thickness, 50 mm.; length, 2,000 mm. | 0.20 | 0.09 | 0.65 | 0.010 | 0.022 |
| Consumable nozzle—O.D., 12 mm.; I.D., 4 mm. | 0.04 | 0.07 | 0.41 | 0.014 | 0.018 |
| Welding wire— 3.2 mm. Dia. | 0.08 | 0.28 | 1.28 | 0.012 | 0.010 |
| Spacers—thickness, 6 mm.; length, 1,900 mm. | 0.10 | 0.06 | 0.67 | 0.020 | 0.015 |

Remarks: In order to weld 2000 mm. of the base metal, two nozzles having length of 1100 mm. each are connected to give the total length of 2200 mm.

*Composition (percent) of coated layer of nozzle and flux used*

| | |
|---|---|
| $SiO_2$ | 41 |
| CaO | 24 |
| MgO | 6 |
| MnO | 15 |
| $Al_2O_3$ | 2 |
| $CaF_2$ | 12 |
| Thickness of coated layer _____ mm | 2 |
| Length of gap between metal ends _____ mm | 20 |
| Welding conditions: | |
| Electric current _____ a | 550 |
| Voltage _____ v | 45 |
| Depth of slag pool _____ mm | 45 |

Remarks: Spacers were inserted into the gap between the opposite ends of the two metals and welded thereto before welding of the entire gap.

*Result of welding*

The rotation of deformation at the top was 0.3 mm. This is in contrast to that of 4 mm. obtained when a spacer was not used, all other conditions being equal. Moreover, the welding velocity was 1500 mm./hr., which is a 20% increase over the case in which the spacer was not used.

The spacers were inserted into the central portion of the gap, welded thereto, and the two-layer welding was effected.

EXAMPLE 4.—ELECTROSLAG TWO-LAYER, BUTT-WELDING WITH THE USE OF COATED, CONSUMABLE NOZZLE AND SPACERS

| | Percent | | | | |
|---|---|---|---|---|---|
| | C | Si | Mn | P | S |
| Steel plate—thickness, 100 mm.; length, 600 mm. | 0.15 | 0.22 | 0.80 | 0.015 | 0.019 |
| Consumable nozzle—O.D., 12 mm.; I.D., 4 mm.; length, 700 mm. | 0.10 | 0.01 | 0.50 | 0.012 | 0.017 |
| Welding wire—Dia., 3.2 mm. | 0.09 | 0.27 | 0.95 | 0.018 | 0.009 |
| Spacers—thickness, 20 mm.; length, 600 mm.; width, 25 mm. | 0.16 | 0.08 | 0.75 | 0.015 | 0.018 |

*Composition (percent) of coated layer of nozzle and flux used*

| | |
|---|---|
| $SiO_2$ | 29 |
| CaO | 31 |
| MgO | 21 |
| $Al_2O_3$ | 10 |
| $CaF_2$ | 9 |
| Thickness of coated layer _____ mm | 2 |
| Length of gap between metal ends _____ mm | 25 |

| Two-layer welding conditions | First layer | Second layer |
|---|---|---|
| Electric current, A | 550 | 500 |
| Voltage, V | 48 | 56 |
| Depth of slag pool, mm | 50 | 55 |

*Result of welding*

Since the spacers were completely melted by the welding of the second layer, the components of the welded metal were uniform as shown below:

| | Percent | | | | |
|---|---|---|---|---|---|
| | C | Si | Mn | P | S |
| First layer | 0.14 | 0.23 | 0.89 | 0.014 | 0.015 |
| Central part | 0.14 | 0.22 | 0.89 | 0.013 | 0.015 |
| Second layer | 0.13 | 0.22 | 0.85 | 0.013 | 0.015 |

*Result of impact test (2 mm. V-notch, 20° C.)*

| | |
|---|---|
| First layer _____ kg.-m./cm.² | 8 |
| Central part _____ kg.-m./cm.² | 8 |
| Second layer _____ kg.-m./cm.² | 5 |

EXAMPLE 5.—ELECTROSLAG BUTT-WELDING WITH THE USE OF COATED, CONSUMABLE NOZZLE

|  | Percent | | | | |
|---|---|---|---|---|---|
|  | C | Si | Mn | P | S |
| Steel plate—thickness, 12 mm.; length, 800 mm. | 0.18 | 0.01 | 0.56 | 0.013 | 0.015 |
| Consumable nozzle—O.D., 8 mm.; I.D., 4 mm.; length, 900 mm. | 0.04 | 0.07 | 0.41 | 0.014 | 0.018 |
| Welding wire—Dia., 2.4 mm. | 0.08 | 0.30 | 1.47 | 0.016 | 0.009 |

*Composition (percent) of coated layer of nozzle and flux used*

| | |
|---|---|
| $SiO_2$ | 41 |
| CaO | 26 |
| MgO | 6 |
| MnO | 15 |
| $Al_2O_3$ | 2 |
| $CaF_2$ | 12 |
| Thickness of coated layer _____ mm__ | 0.5 |
| Length of gap between metal ends _____ mm__ | 15 |
| Welding conditions: | |
|    Electric current _____ a__ | 400 |
|    Voltage _____ v__ | 28 |
|    Depth of slag pool _____ mm__ | 30 |

The welding velocity was 4.6 m./hr.

The test of tensile strength was 48 kg./cm.$^3$. The bending test was also good.

Having regard to the foregoing disclosure, the following is claimed as the inventive and patentable embodiments thereof:

1. In the process for electroslag welding of base metals by pasing an electric current through a slag pool via an electrode, one end of which is immersed in the pool to form a weld, and feeding the electrode through a nozzle into the slag pool as it is consumed therein, the improvement which comprises employing as the nozzle a consumable nozzle having thereon an insulating layer, comprising an electroslag welding flux having a composition by weight of from about 20 to 50% silicon dioxide, from about 5 to about 40% calcium oxide, up to about 25% magnesium oxide, up to about 25% manganous oxide, up to about 15% aluminum oxide, and up to about 40% calcium fluoride.

2. A process in accordance with claim 1, including disposing cooling plates about the weld.

3. A process in accordance with claim 1, including disposing spacer members between the base metals to be welded.

4. A process in accordance with claim 1, in which the insulating layer is from about 0.5 to about 2.5 mm. in thickness.

5. A process in accordance with claim 1, in which the insulating layer includes an alloying agent in an amount up to about 30% by weight.

6. A process in accordance with claim 1, in which the annular sectional area of the consumable nozzle is within the range from about 35 to about 200 mm.$^2$.

References Cited

UNITED STATES PATENTS

| | | | |
|---|---|---|---|
| 2,200,737 | 5/1940 | Clapp | 219—73 |
| 2,326,865 | 8/1943 | Kennedy | 219—73 |
| 2,751,478 | 6/1956 | Jackson et al. | 219—73 |
| 2,868,951 | 1/1959 | Shrubsall | 219—74 |
| 2,972,041 | 2/1961 | Mosny et al. | 219—73 |
| 3,046,383 | 7/1962 | Cabelka | 219—73 |
| 3,152,019 | 10/1964 | Shrubsall | 219—73 X |
| 3,291,955 | 12/1966 | Shrubsall | 219—73 |

RICHARD M. WOOD, *Primary Examiner.*